United States Patent [19]

Shinzawa et al.

[11] Patent Number: 4,610,138
[45] Date of Patent: Sep. 9, 1986

[54] EXHAUST PARTICLE REMOVING SYSTEM FOR AN INTERNAL COMBUSTION ENGINE

[75] Inventors: Motohiro Shinzawa; Yasuo Nakajima, both of Yokosuka, Japan

[73] Assignee: Nissan Motor Company, Limited, Japan

[21] Appl. No.: 651,719

[22] Filed: Sep. 18, 1984

[30] Foreign Application Priority Data

Sep. 26, 1983 [JP] Japan ................................. 58-177612
Sep. 30, 1983 [JP] Japan ................................. 58-183677

[51] Int. Cl.⁴ ............................................. F01N 3/02
[52] U.S. Cl. ........................................ 60/286; 55/283; 55/DIG. 30; 60/303; 60/311
[58] Field of Search ................ 60/274, 286, 303, 311; 55/DIG. 30, 283

[56] References Cited

U.S. PATENT DOCUMENTS 4,281,512  8/1981  Mills ................ 55/DIG. 30
4,450,682  5/1984  Sato ...................... 60/311
4,492,079  1/1985  Takagi ................... 60/286

FOREIGN PATENT DOCUMENTS 510  1/1981  Japan ..................................... 60/311

*Primary Examiner*—Douglas Hart
*Attorney, Agent, or Firm*—Lowe, Price, LeBlanc, Becker & Shur

[57] ABSTRACT

A filter is disposed in the exhaust passage of an internal combustion engine in order to trap particles suspended in exhaust gas. A burner serves to burn off the particles deposited on the filter. Either the pressure in the exhaust passage at a point upstream of the filter or the pressure difference in the exhaust passage across the filter is selectively sensed. In place of sensing the pressure difference, the pressure in the exhaust passage at a point downstream of the filter may be sensed. The ratio between the upstream pressure and the pressure difference, or the ratio between the upstream pressure and downstream pressure is determined an as indication of the degree of clogging of the filter. The burner is operated on the basis of this ratio.

12 Claims, 14 Drawing Figures

EXHAUST PARTICLE REMOVING SYSTEM FOR AN INTERNAL COMBUSTION ENGINE

BACKGROUND OF THE INVENTION

This invention relates to a system for removing particles from exhaust produced by internal combustion engines, such as diesel engines.

Exhaust produced by diesel engines has a relatively high content of polluting particles composed of carbon, unburned fuel, and partially burned fuel. Filters disposed in engine exhaust systems are conventionally used to remove the particles from the exhaust. In this case, burners positioned in the exhaust systems upstream of the filters are often employed to burn off the particles deposited on the filters in order to unclog and rejuvenate the filters.

Japanese patent publication No. 56-115809 discloses such a particle removing system. In this system, the pressure across the filter is monitored as an indication of the degree of clogging of the filter When this pressure rises to a preset level, the burner is activated to unclog the filter. The pressure across the filter, however, inaccurately represents the degree of clogging of the filter for the following reason: this pressure depends not only on the degree of clogging of the filter but also on the rate of exhaust flow. This inaccuracy in the recognized degree of clogging of the filter could allow clogging to an acceptable level or wasteful overuse of the burner.

SUMMARY OF THE INVENTION

It is an object of this invention to provide an exhaust particle removing system for an internal combustion engine which accurately determines the degree of clogging of a filter and thereby reliably maintains this degree within an acceptable range.

In accordance with this invention, an exhaust particle removing system includes a filter and a burner. The filter is disposed in the exhaust passage of an internal combustion engine in order to trap particles suspended in exhaust gas. The burner serves to burn off the particles deposited on the filter. Either the pressure in the exhaust passage at a point upstream of the filter or the pressure difference in the exhaust passage across the filter is selectively sensed. In place of sensing the pressure difference, the pressure in the exhaust passage at a point downstream of the filter may be sensed. The ratio between the upstream pressure and the pressure difference, or the ratio between the upstream pressure and downstream pressure is determined as an indication of the degree of clogging of the filter. The burner is operated on the basis of this ratio.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
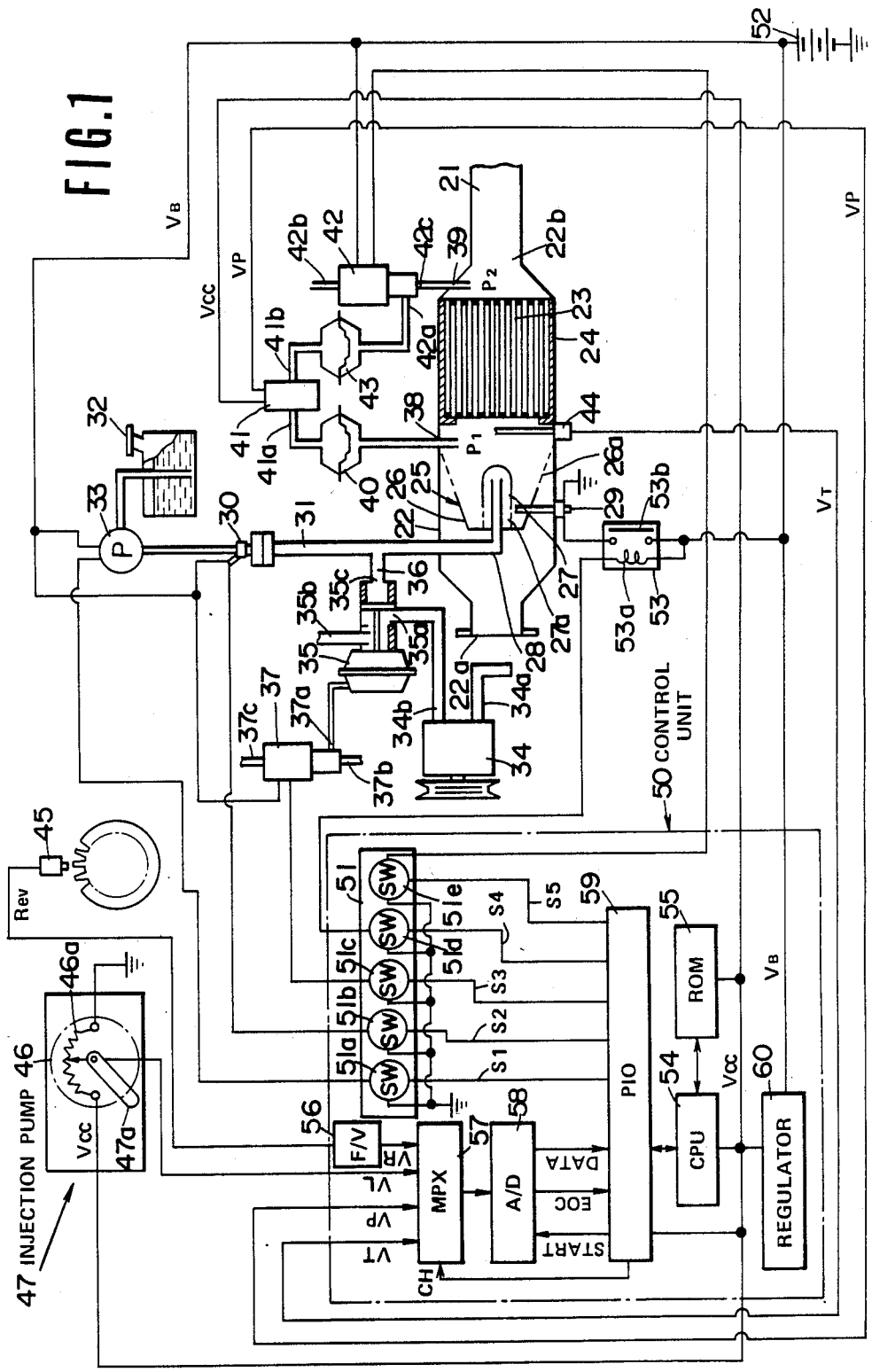
FIG. 1 is a diagram of an exhaust particle removing system according to a first embodiment of this invention.

With reference to FIG. 1, an exhaust passage 21 extends from a diesel engine (not shown) to conduct exhaust gas from the engine. A casing 22 defines a chamber therein. The casing 22 has an inlet 22a and an outlet 22b in communication with each other via the chamber. This casing 22 is disposed with respect to the exhaust passage 21 in such a way that the chamber in the casing 22 constitutes a part of the exhaust passage 21 and that exhaust gas enters the cahmber via the inlet 22a and exits from the chamber via the outlet 22b.

A filter 23 of a honeycomb structure is disposed within the downstream half of the casing 22 to trap particles suspended in the exhaust gas. A buffer 24 is sandwiched between the filter 23 and the walls of the casing 22 so that the filter 23 is gently supported within the casing 22. This filter 23 has a plurality of parallel holes extending between the upstream and downstream ends of the filter 23. These holes are of two types. The holes of the first type have open upstream ends and closed downstream ends. The holes of the second type have closed upstream ends and open downstream ends. The first holes adjoin the second holes via porous walls of the filter 23 so that the exhaust gas first enters the first holes and then passes through the porous walls into the second holes before exiting via the second holes. As the exhaust gas passes through the porous walls, particles suspended in these gases are trapped by the walls.

A burner 25 disposed within the upstream half of the casing 22 serves to burn off the particles trapped by the filter 23. The burner 25 includes a cylindrical combustion liner 26, a mixture vaporizing tube 27, a mixture injection tube 28, and a glow plug 29. The combustion liner 26 defines a combustion chamber in a region immediately upstream of the filter 23. The combustion liner 26 has a plurality of apertures 26a which admit exhaust gas into the combustion chamber. After passing through the combustion chamber, the exhaust gas enters the filter 23. The mixture vaporizing tube 27 is disposed within the combustion liner 26. The mixture injection tube 28 extends through the walls of the liner 26 into the mixture vaporizing tube 27. The mixture injection tube 28 serves to discharge a mixture of air and fuel into the mixture vaporizing tube 27. The discharge mixture reverses its flow and then flows out of the mixture vaporizing tube 27 into the combustion chamber via an opening or openings 27a through the walls of the tube 27. The glow plug 29 projects into a section of the combustion chamber near the opening 27a to ignite the mixture entering the combustion chamber. After igniting, the mixture burns in the combustion chamber and thereby the particles trapped by the filter 23 are burned off of the filter 23. Furthermore the combustion of the mixture heats the mixture vaporizing tube 27, thereby speeding evaporation of the fuel in the tube 27 and thus facilitating ignition of the subsequently supplied mixture.

An electromagnetic-type fuel supply control valve 30 has an outlet connected to the mixture injection tube 28 via a fuel feed pipe 31. Fuel is driven from a fuel tank 32 to an inlet of the fuel valve 30 by an electrically-powered fuel pump 33. This fuel may consist of the same gas oil used to run the engine. When the fuel valve 30 is open, fuel is admitted into the mixture injection tube 28 via the mixture feed pipe 31 provided that the fuel pump 33 is activated. Thus, when the fuel valve 30 is closed, fuel admission is interrupted. Electrical energization and de-energization of the fuel valve 30 causes the fuel valve 30 to be opened and closed respectively.

An engine-driven air pump 34 has an inlet 34a and an outlet 34b. The inlet 34a leads to the open air via an air cleaner (not shown). The air pump 34 draws air via the inlet 34a and discharges it via the outlet 34b. A pressure-operated three-way valve 35 has a control chamber partially defined by a spring-loaded diaphragm, a first port 35a, a second port 35b, and a third port 35c. The first port 35a is connected to the air pump outlet 34b. The second port 35b leads to the open air via the air cleaner. The third port 35c is connected to the mixture injection tube 28 via an air feed pipe 36. When the control chamber is supplied with atmospheric pressure, the first port 35a is connected to the second port 35b and is disconnected from the third port 35c so that air driven by the air pump 34 is relieved via the valve 35 and thus the mixture injection tube 28 does not receive any air. When the control chamber is supplied with a preset vacuum, the first port 35a is connected to the third port 35c and is disconnected from the second port 35b so that air driven by the air pump 34 enters the mixture injection tube 28 via the valve 35 and the air feed pipe 36.

Changes of the pressures to the control chamber of the valve 35 are realized via an electromagnetic three-way valve 37 having a first port 37a, a second port 37b, and a third port 37c. The first port 37a is connected to the control chamber of the valve 35. The second port 37b is connected to a vacuum source, such as an engine-driven vacuum pump. The third port 37c leads to the open air via the air cleaner. When the electromagnetic valve 37 is electrically de-energized, the first port 37a is connected to the third port 37c and is disconnected from the second port 37b so that atmospheric pressure is supplied to the control chamber of the valve 35, thereby interrupting the air supply to the mixture injection tube 28. When the electromagnetic valve 37 is electrically energized, the first port 37a is connected to the second port 37b and is disconnected from the third port 37c so that the preset vacuum is supplied to the control chamber of the valve 35, thereby enabling the air supply to the mixture injection tube 28.

A control unit 50 includes a switch section 51 having switches 51a, 51b, 51c, 51d, and 51e. Each of these switches 51a, 51b, 51c, 51d, and 51e consists mainly of a switching power transistor. The fuel pump 33 is electrically connected across a battery 52 via the switch 51a so that it is electrically energized and de-energized when the switch 51a is closed and opened respectively. The fuel valve 30 is electrically connected across the battery 52 via the switch 51b so that it is electrically energized and de-energized when the switch 51b is closed and opened respectively. The air valve 37 is electrically connected across the battery 52 via the switch 51c so that it is electrically energized and de-energized when the switch 51c is closed and opened respectively. A relay 53 has a control winding 53a and a switch 53b. Electrical energization and de-energization of the control winding 53a causes the switch 53b to be closed and opened respectively. The glow plug 29 is electrically connected across the battery 52 via the relay switch 53b so that it is electrically energized and de-energized when the relay switch 53b is closed and opened respectively. The relay winding 53a is connected across the battery 52 via the switch 51d so that it is electrically energized and de-energized when the switch 51d is closed and opened respectively. As a result, closing and opening of the switch 51d causes the glow plug 29 to be activated and de-activated respectively. The switches 51a, 51b, 51c, and 51d have control terminals to which electrical signals S1, S2, S3, and S4 are applied respectively to control the switches 51a, 51b, 51c, and 51d via these signals S1, S2, S3, and S4.

When all of the switches 51a, 51b, 51c, and 51d are closed, the fuel pump 33, the fuel valve 30, the air valve 37, and the glow plug 29 are all electrically energized. As a result, fuel is driven by the fuel pump 33 into the mixture injection tube 28 via the fuel valve 30 and air is admitted from the air pump 34 into the mixture injection tube 28 via the air valve 35. A mixture of air and fuel thus results, which is discharged into the combustion chamber of the burner 25. The discharged mixture is ignited by the glow plug 29. Thus, in this case, the burner 25 is activated.

In more detail, the fuel valve 30 is energized intermittently at a constant frequency during activation of the burner 25. The rate of fuel supply to the burner 25 is determined by the duty cycle of current pulses flowing through the fuel valve 30.

When all of the switches 51a, 51b, 51c, and 51d are opened, the fuel pump 33, the fuel valve 30, the air valve 35, and the glow plug 29 are all electrically de-energized. As a result, the fuel valve 30 interrupts admission of fuel into the mixture injection tube 28 and the air valve 35 interrupts admission of air into the mixture injection tube 28, so that no air-fuel mixture is supplied to the burner 25. Thus, in this case, the burner 25 is de-activated.

A first pressure introduction passage 38 connects the interior of the casing 22 to a first inlet 41a of a pressure difference sensor 41. The junction of this passage 38 and the interior of the casing 22 is located at a point immediately upstream of the filter 23 so that the sensor inlet 41a is supplied with the pressure in the casing 22 at this point. This pressure will be referred to as the upstream pressure P1 hereafter. A diaphragm 40 disposed in the passage 38 prevents the transmission of heat and moisture but allows the transmission of pressure along the passage 38.

An electromagnetic three-way valve 42 has a first port 42a, a second port 42b, and a third port 42c. The first port 42a is connected to a second inlet 41b of the pressure difference sensor 41. A diaphragm 43 disposed in the connection between the sensor inlet 41b and the first port 42a prevents the transmission of heat and moisture but allows the transmission of pressure along this connection. The second port 42b leads to the open air via the air cleaner. The third port 42c is connected via a second pressure introduction passage 39 to the interior of the casing 22 at a point immediately downstream of the filter 23. When the electromagnetic valve 42 is electrically de-energized, the first port 42a is connected to the second port 42b and is disconnected from the third port 42c so that the sensor inlet 41b is supplied with atmospheric pressure. When the electromagnetic valve 42 is electrically energized, the first port 42a is connected to the third port 42c and is disconnected from the second port 42b so that the sensor inlet 41b is supplied with the pressure in the casing 22 at a point downstream of the filter 23, referred to as the downstream pressure P2 hereafter.

It should be noted that the combination of a normally-open electromagnetic valve and a normally-closed electromagnetic valve may be used in place of the three-way valve 42.

The pressure sensor 41 senses the difference in pressure between the first and second inlets 41a and 41b. Accordingly, when the three-way valve 42 is de-energized and thus the second inlet 41b is supplied with atmospheric pressure, the pressure sensor 41 detects the upstream pressure P1 with respect to atmospheric pressure. It should be noted that the first inlet 41a is continuously supplied with the upstream pressure P1. When the three-way valve 42 is energized and thus the second inlet 41b is supplied with the downstream pressure P2, the pressure sensor 41 detects the difference between the upstream and downstream pressures P1 and P2. The pressure sensor 41 outputs a signal VP representing the detected pressure value.

The pressure sensor 41 may have a piezoelectric element and a gauge resistor provided on a silicon diaphragm whose opposing surfaces are subjected to the pressures in the first and second inlets 41a and 41b respectively. In this case, the effective resistance of the gauge resistor varies as a function of the difference in pressure between the first and second inlets 41a and 41b. A voltage regulator 60 in the control unit 50 derives a constant voltage Vcc from the voltage VB across the battery 52. This constant voltage Vcc is applied across a series combination of a reference fixed resistor and the gauge resistor, so that the voltage across the gauge resistor or the voltage across the fixed resistor varies as a function of the resistance of the gauge resistor. Since the resistance of the gauge resistor depends on the pressure difference, the voltage across the gauge resistor or the voltage across the fixed resistor represents that pressure difference. This voltage is outputted by the sensor 41 as a pressure signal VP.

The three-way valve 42 is electrically connected across the battery 52 via the switch 51e so as to be electrically energized and de-energized when the switch 51e is closed and opened respectively. Accordingly, closing of the switch 51e allows the pressure sensor 41 to detect the difference between the upstream and downstream pressures P1 and P2. Opening of the switch 51e allows the pressure sensor 41 to detect the upstream pressure P1 relative to atmospheric pressure. An electrical signal S5 is applied to a control terminal of the switch 51e in order to control the switch 51e.

A temperature sensor 44 is disposed within the casing 22 at a point directly upstream of the center of the end face of the filter 23. The temperature sensor 44 outputs a voltage VT representing the temperature at that point. This temperature sensor 44 may consist basically of a thermocouple.

An engine speed sensor 45 monitors the rotational speed of the engine. This speed sensor 45 includes a crank angle sensor generating pulses corresponding to evenly spaced angular positions of the engine crankshaft. The frequency of these pulses is thus proportional to the engine speed. The speed sensor 45 outputs the resulting pulse signal Rev, the frequency of which indicates the engine speed. A frequency-to-voltage (F/V) converter 56 in the control unit 50 is connected to the engine speed sensor 45 to receive the pulse signal Rev. This circuit 56 converts the pulse signal Rev to a voltage VR which varies as a function of the engine speed.

An engine load sensor 46 monitors the load on the engine. This load sensor 46 includes a potentiometer 46a, the adjustment shaft of which is linked to the control lever 47a of a fuel injection pump 47. The angular position of the control lever 47a determines the rate of fuel injection into the engine. This control lever 47a is connected to an accelerator (not shown) so that the angular position of the control lever 47a reflects the power output required of the engine, that is, the load on the engine. The constant voltage Vcc outputted by the voltage regulator 60 is applied across the resistor of the potentiometer 46a. As a result, the potentiometer 46a outputs a voltage VL which varies as a function of the engine load.

The control unit 50 includes a digital central processing unit (CPU) 54, a read-only memory (ROM) 55, a multiplexer (MPX) 57, an analog-to-digital (A/D) converter 58, and a peripheral input/output (PIO) circuit 59.

The multiplexer 57 is connected to the sensors 38, 40, and 42, and the F/V converter 56 to receive the pressure signal VP, the temperature signal VT, the engine load signal VL, and the engine speed signal VR. The multiplexer 57 selects one of these signals in accordance with a channel selection signal CH issued by the PIO circuit 59 and passes it to the A/D converter 58. This signal CH has four different states corresponding to the four different selections. After receiving a start signal Start from the PIO circuit 59, the A/D converter 58 commences converting the selected signal to a corresponding digital signal DATA. Upon completion of the conversion, the A/D converter 58 outputs an end-of-conversion signal EOC to the PIO circuit 59 and then the digital signal DATA is transmitted to the PIO circuit 59.

The PIO circuit 59 also outputs the control signals S1, S2, S3, S4, and S5 to the switches 51a, 51b, 51c, 51d, and 51e of the section 51 via connections between the circuit 59 and the switches 51a, 51b, 51c, 51d, and 51e.

The CPU 54 is connected to the PIO circuit 59 and the ROM 55 holding a program and fixed data. The CPU 54 has an internal random-access memory (RAM). The CPU 54, the ROM 55, and the PIO circuit 59 are connected to the voltage regulator 60 so as to be powered by the constant voltage Vcc. It should be noted that the other circuits 51, 56, 57, and 58 are also powered by this constant voltage Vcc.

Since exhaust gas generally exhibits laminar flow in the filter 23, the pressure P1 in the exhaust passage 21 at a point upstream of the filter 23, the pressure P2 in the exhaust passage 21 at a point downstream of the filter 23, and the pressure difference ΔP across the fitler 23 are all approximately proportional to the rate of exhaust gas flow through the filter 23 provided that the resistance of the filter 23, that is, the degree of clogging of the filter 23 is constant. The pressure difference ΔP equals the upstream pressure P1 minus the downstream pressure P2. At a fixed degree of clogging of the filter 23, the ratio between the pressure P1 and P2 as well as the ratio between the upstream pressure P1 and the pressure difference ΔP thus remain at approximately constant levels independent of the rate of exhaust gas flow.

Figure 2:
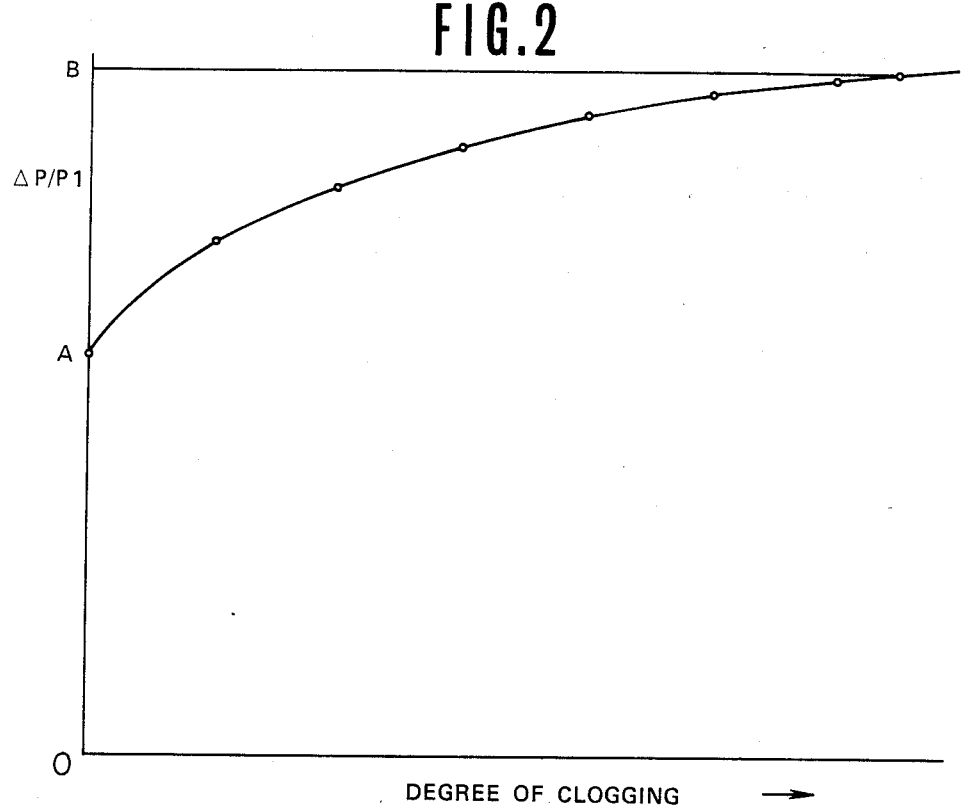
FIG. 2 is a graph of the relationship between the degree of clogging of the filter and the ratio of the upstream pressure to the pressure difference.

FIG. 2 shows the experimental relationship between the degree of clogging of the filter 23 and the ratio of the upstream pressure P1 to the pressure difference ΔP. As the degree of clogging of the filter 23 increases, this ratio ΔP/P1 also increases. Thus, this ratio ΔP/P1 represents the degree of clogging of the filter 23. The ratio ΔP/P1 is an accurate indication of the degree of clogging of the filter 23, since it is independent of the rate of exhaust gas flow as described previously. It should be noted that the ratio between the pressures P1 and P2 also accurately represents the degree of clogging of the filter 23.

Figure 3:
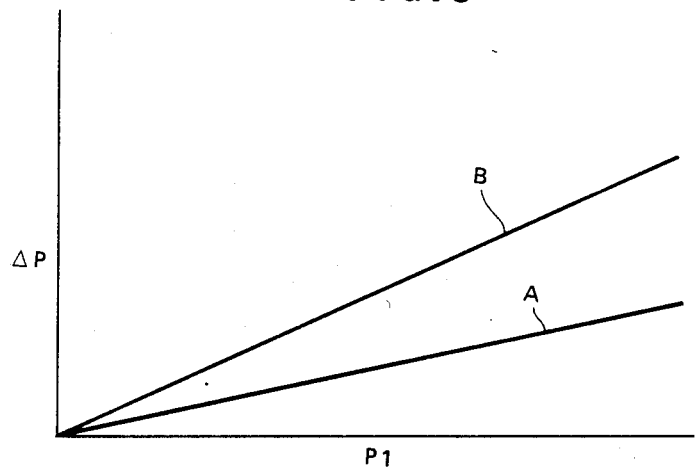
FIG. 3 is a graph of the relationship between the upstream pressure and the pressure difference.

FIG. 3 shows the experimental relationship between the upstream pressure P1 and the pressure difference ΔP. In this graph, the lower line A corresponds to a minimum level of clogging of the filter 23, while the upper line B corresponds to a reference level separating acceptable and unacceptable ranges of clogging of the filter 23. When the ratio of the upstream pressure P1 to the difference pressure ΔP reaches this reference level, the burner 25 should be activated to unclog the filter 23. These lines A and B represent values of the ratio of the upstream pressure P1 to the pressure difference ΔP which are denoted by the letters A and B in FIG. 2 respectively.

Figure 4:
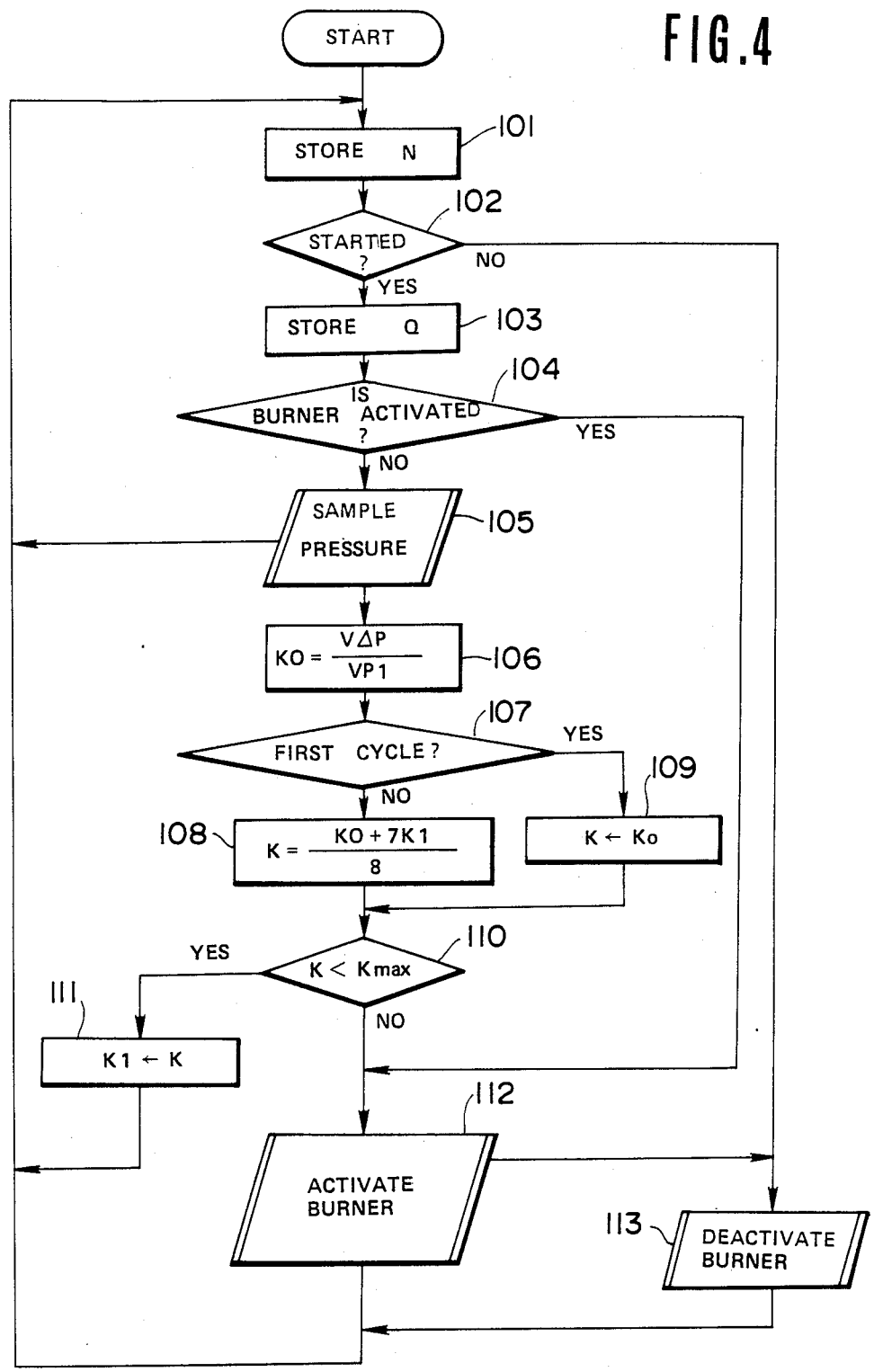
FIG. 4 is a flowchart of a program for controlling the operation of the control unit 50.

The control unit 50 operates in accordance with a program stored in the ROM 55. FIG. 4 is a flowchart of this program. In this program, the ratio of the sensed upstream pressure P1 to the pressure difference ΔP is determined and used as an indication of the degree of clogging of the filter 23 in view of the considerations relating to FIGS. 2 and 3.

In the initial step 101 of this program, the current value of the engine speed derived from the engine speed signal VR is stored in the RAM of the CPU 54. In this flowchart, the variable N represents this engine speed value. After the step 101, the program advances to a step 102.

In the step 102, the CPU 54 determines whether or not the engine has started, specifically whether or not the engine speed value N exceeds a preset level Nref1 preferably chosen to be 150 rpm. If the engine has not yet started, that is, if the engine speed value N does not exceed the preset level Nerf1, the program returns from the step 102 to the initial step 101 via a step 113 in which the burner 25 is deactivated. If the engine has started, that is, if the engine speed value N exceeds the preset level Nref1, the program advances from the step 102 to a step 103.

In the step 103, the current value of the engine load derived from the engine load signal VL is stored in the RAM of the CPU 54. In this flowchart, the variable Q represents this engine load value. After the step 103, the program advances to a step 104.

In the step 104, the CPU 54 determines whether or not the burner 25 is active. If the burner 25 is active, the program advances to a step 112 in which activation of the burner 25 is maintained. If the burner 25 is inactive, the program advances to a step 105.

In the step 105, the current values of the upstream pressure P1 and the pressure difference ΔP are sampled and stored as described in more detail hereafter. In this flowchart, the variables VP1 and VΔP represent the upstream pressure value and the pressure difference value respectively. As will be made clear later, this step 105 branches to either the initial step 101 or a step 106.

In the step 106, the CPU 54 determines the ratio of the upstream pressure value VP1 to the pressure difference value VΔP. In this flowchart, this ratio is represented by the variable K0. Specifically, "K0=VΔP/VP1" is executed. It should be noted that VΔP/VP1=1−(VP2/VP1), where VP2 is the downstream pressure.

In a step 107 subsequent to the step 106, the CPU 54 determines whether or not this is the first cycle of execution of the program since the engine was started or since the last unclogging of the filter 23 was completed. If this is not the first execution cycle, the program proceeds to a step 108. In the first execution cycle, the program proceeds to a step 109.

In the step 109, the ratio value K0 is stored in a location in the RAM of the CPU 54 which is designated by the variable K in this flowchart. In other words, "K=K0" is executed. After the step 109, the program advances to a step 110.

In the step 108, "K=(K0+7K1)/8" is executed. In this equation, K1 is the variable representing the preceding value of the variable K as will be made clear with reference to a step 111 described hereafter. Accordingly, this step 108 calculates the weighted mean value of the current ratio value K0 and the preceding value of the variable K having components of the previous ratio values K0. This current mean value of the variable K is used as a final indication of the degree of clogging of the filter 23. The weighted mean prevents erroneous determination of the degree of clogging of the filter 23 resulting from questionable abrupt changes in the ratio value K0. The factor of this weighted mean may be values other than that used in this embodiment. After the step 108, the program advances to the step 110.

In the step 110, the CPU 54 determines whether or not the value of the variable K is smaller than a preset value Kmax. This reference value Kmax is chosen to be equal to the boundary between acceptable and unacceptable ranges of clogging of the filter 23. If the value K is smaller than the reference value Kmax, that is, if the degree of clogging of the filter 23 is acceptable, the program proceeds from the step 110 to the step 111. If the value K is not smaller than the reference value Kmax, that is, if the degree of clogging of the filter 23 is unacceptable, the program proceeds from the 110 to a step 112.

In the step 111, the value of the variable K is stored in a location in the RAM of the CPU 54 which is designated by the variable K1 in this flowchart. After the step 111, the program returns to the initial step 101.

In the step 112, the control unit 50 activates the burner 25 to unclog the filter 23. As a result of cooperation of the steps 110 and 112, when the degree of clogging of the filter 23 reaches its unacceptable level, the burner 25 is automatically activated to unclog the filter 23. The step 112 branches to either the initial step 101 or the burner deactivation step 113. After the step 113, the program returns to the initial step 101.

As a result of return of the program to the initial step 101, this program is reiterated so that the engine speed value N, the engine load value Q, the upstream pressure value VP1, the pressure difference value V$\Delta$P, the ratio value K0, and the value of the variable K continue to be updated.

Figure 5:
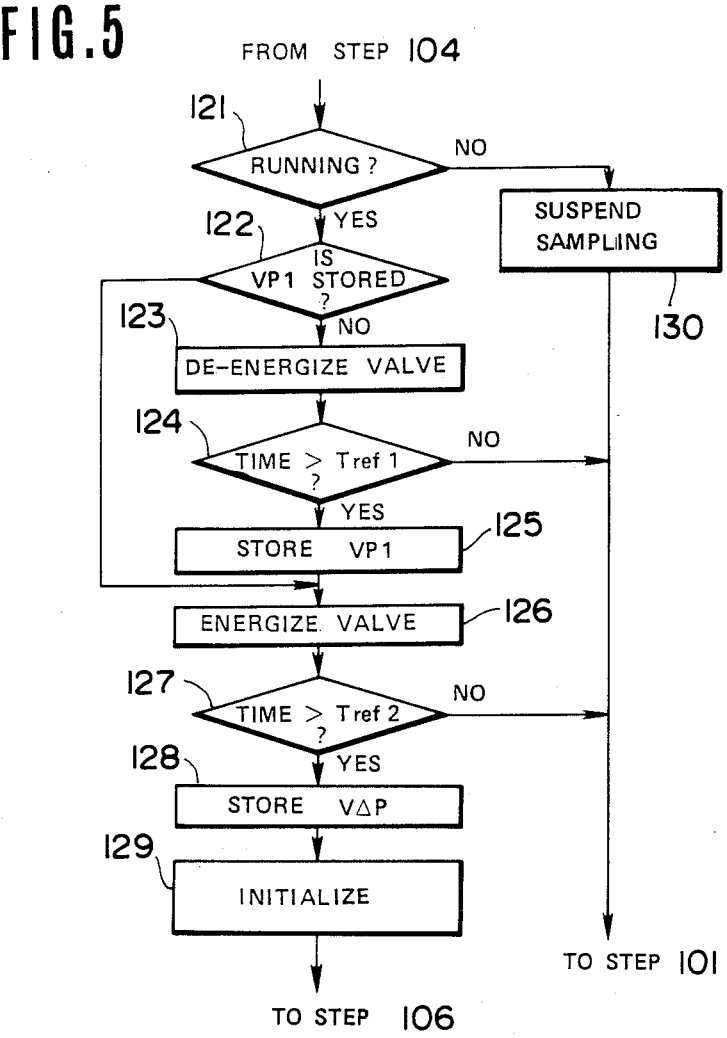
FIG. 5 is a detailed flowchart of the pressure sampling step of FIG. 4.

FIG. 5 is a detailed flowchart of the pressure sampling step 105. In a step 121 following the step 104 (see FIG. 4), the CPU 54 determines whether or not the engine is running normally, specifically whether or not the engine speed value N exceeds a preset level Nref2 preferably chosen to be 500 rpm. If the engine has stopped, that is, if the engine speed value N does not exceed the preset level Nref2, the program returns to the initial step 101 (see FIG. 4) via a step 130 in which the pressure sampling operation is suspended and reinitialized. If the engine is running normally, that is, if the engine speed value N exceeds the preset level Nref2, the program advances to a step 122.

In the step 122, the CPU 54 determines whether or not the upstream pressure value VP1 derived from the pressure signal VP has been already stored in the RAM of the CPU 54 after the moment of the last execution of an intialization step 129 described hereafter. If the upstream pressure value VP1 has not been stored, the program proceeds to a step 123. If the upstream pressure value VP1 has been stored, the program advances to a step 126.

In the step 123, the electromagnetic valve 42 (see FIG. 1) is de-energized or is held in the de-energized state. Specifically, the control signal S5 designed to open the switch 51e (see FIG. 1) is outputted to the control terminal of the switch 51e. As described previously, opening the switch 51e causes de-energization of the electromagnetic valve 42, thereby allowing the pressure sensor 41 (see FIG. 1) to detect the upstream pressure P1 relative to atmospheric pressure.

In a step 124 subsequent to the step 123, the CPU 54 determines whether or not the time elapsed since the moment of de-energization of the electromagnetic valve 42 exceeds a preset interval Tref1. If this elapsed time does not exceed the preset interval Tref1, the program returns to the initial step 101. As a result, the electromagnetic valve 42 continues to be de-energized until the elapsed time reaches the preset interval Tref1. If the elapsed time exceeds the preset interval Tref1, the program advances to a step 125.

In the step 125, the current upstream pressure value VP1 derived from the pressure signal VP is stored in the RAM of the CPU 54. After the step 125, the program proceeds to the step 126.

In the step 126 following one of the steps 122 and 125, the electromagnetic valve 42 is energized. Specifically, the control signal S5 designed to close the switch 51e is outputted to the control terminal of the switch 51e. As described previously, closing of the switch 51e results in energization of the electromagnetic valve 42, thereby allowing the pressure sensor 41 to detect the pressure difference $\Delta$P between the upstream pressure P1 and the downstream pressure P2.

In a step 127 subsequent to the step 126, the CPU 54 determines whether or not the time elapsed since the moment of energization of the electromagnetic valve 42 exceeds a preset interval Tref2. If this elapsed time does not exceed the preset interval Tref2, the program returns to the initial step 101. As a result, the electromagnetic valve 42 continues to be energized until the elapsed time reaches the preset interval Tref2. If the elapsed time exceeds the preset interval Tref2, the program advances to a step 128.

In the step 128, the current pressure difference value V$\Delta$P derived from the pressure signal VP is stored in the RAM of the CPU 54. After the step 128, the program advances to the step 106 (see FIG. 4) via the step 129 in which the pressure derivation operation is initialized, specifically in which the variables relating to the pressure derivation operation are cleared and initialized.

The upstream pressure value VP1 and the pressure difference value V$\Delta$P are sampled in each cycle of execution of the main flow of this pressure derivation step 105, so that these values VP1 and V$\Delta$P are periodically derived and updated.

Figure 6:
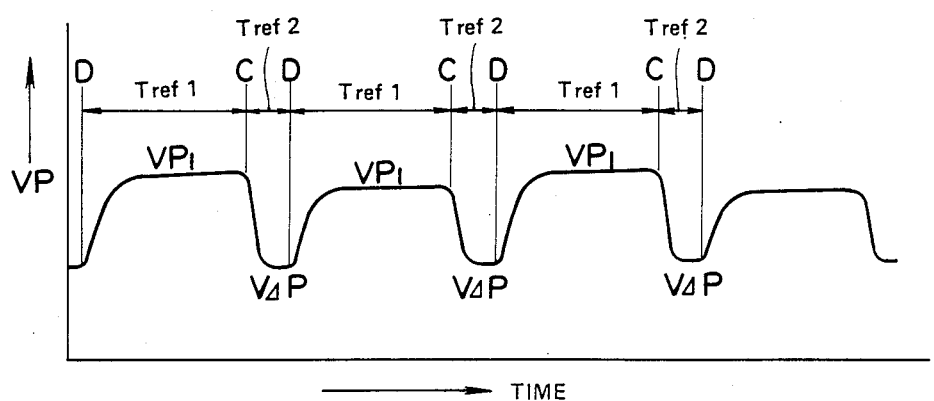
FIG. 6 is a diagram of the waveform of the pressure signal appearing in the system of FIG. 1.

FIG. 6 shows the waveform of the pressure signal VP. The electromagnetic valve 42 is changed from the de-energized state to the energized state at moments denoted by the letter C. The electromagnetic valve 42 is changed from the energized state to the de-energized state at moments denoted by the letter D. During the time intervals Tref1 determined in the step 124 (see FIG. 5), the electromagnetic valve 42 remains de-energized. During the time intervals Tref2 determined in the step 127 (see FIG. 5), the electromagnetic valve 42 remains energized. A certain time lag after changes in the state of the electromagnetic valve 42, the pressure signal VP reflects the true pressure values. The time intervals Tref1 and Tref2 are chosen to be longer than this time lag. The time interval Tref1 is preferably longer than the time interval Tref2 to decrease the frequency of changes in the states of the electromagnetic valve 42 in order to increase the service life of the valve 42. The shorter time interval Tref2 is preferably 0.2 seconds. The moments of sampling of the upstream pressure values VP1 immediately precede the moments C at which the electromagnetic valve 42 is energized. The moments of sampling of the pressure difference value V$\Delta$P immediately precede the moments D at which the electromagnetic valve 42 is de-energized. The intervals between the sampling of the paired values VP1 and V$\Delta$P are essentially equal to the preset interval Tref2. Since this interval Tref2 is short, the paired values VP1 and V$\Delta$P provide respective indications induced essentially at the same moment. This setting maintains accuracy of these values VP1 and V$\Delta$P even under rapidly changing operating conditions of the engine.

Figure 7:
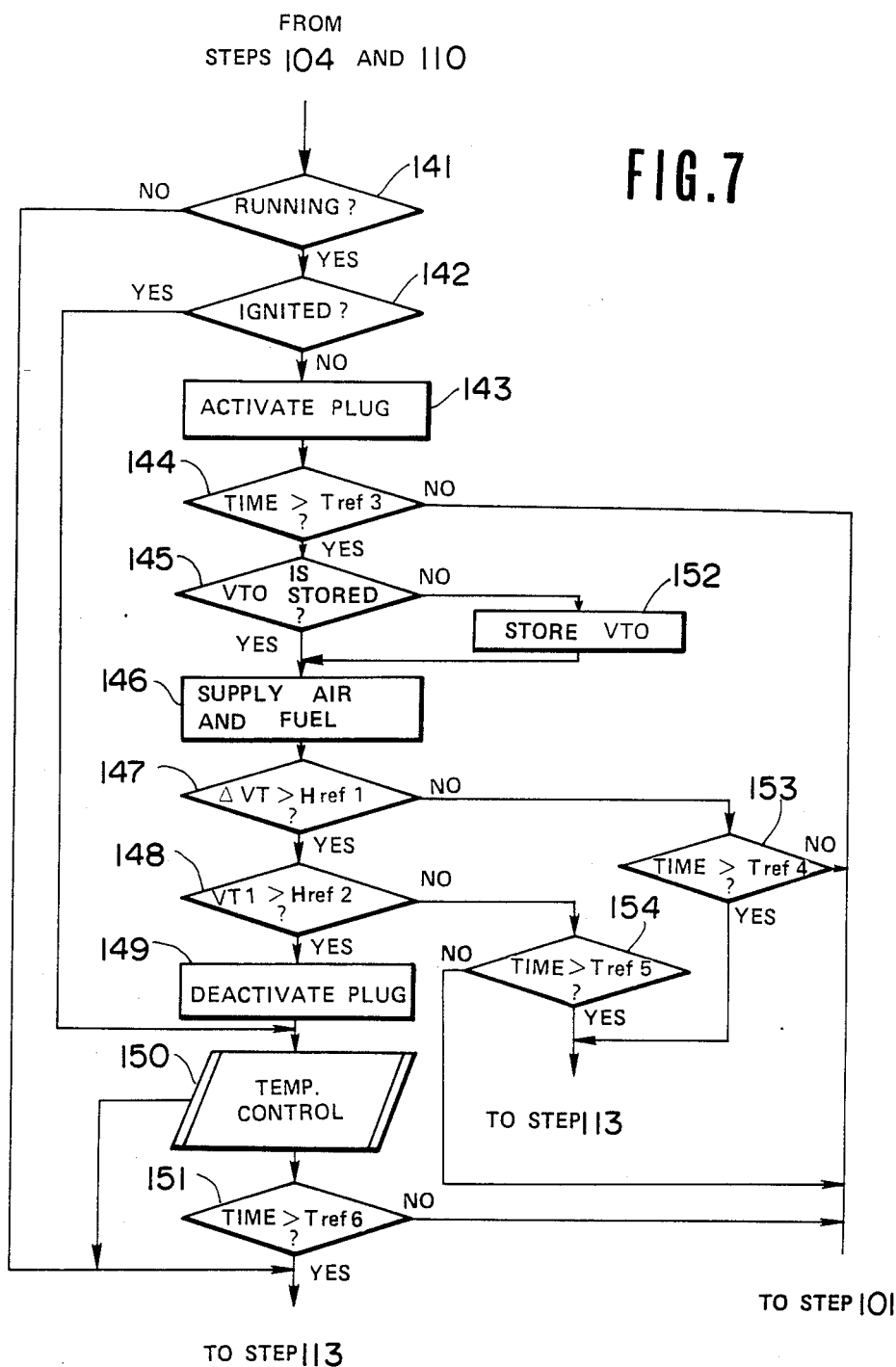
FIG. 7 is a detailed flowchart of the burner activation step of FIG. 4.

FIG. 7 is a detailed flowchart of the burner activation step 112. In the step 141 following one of the steps 104 and 110 (see FIG. 4), the CPU 54 determines whether or not the engine is running normally, specifically whether or not the engine speed value N exceeds a preset level Nref3 preferably chosen to be 500 rpm. If the engine has stopped, that is, if the engine speed value N does not exceed the preset level Nref3, the program advances to the burner deactivation step 113 (see FIG. 4). If the engine is running normally, that is, if the engine speed value N exceeds the preset level Nref3, the program advances to a step 142.

In the step 142, the CPU 54 determines whether or not ignition of the air-fuel mixture has been completed on the basis of the current temperature value derived from the temperature signal VT. Specifically, determination is made about whether or not a preset increase in the temperature value occurs within a predetermined interval after commencement of air and fuel supply, that is, whether or not the temperature value reaches a preset level for the predetermined interval. If ignition has been achieved, that is, if the temperature value exceeds the preset level, the program advances to a step 150. If ignition has not been achieved, that is, if the temperature value does not exceed the preset level, the program advances to a step 143. Generally, ignition is not achieved immediately, so that the program will repeatedly advance from the step 142 to the step 143 at early stages.

In the step 143, the control unit 50 activates the glow plug 29. Specifically, the control signal S4 designed to close the switch 51d is outputted to the control terminal of the switch 51d. As described previously, closing of the switch 51d results in activation of the glow plug 29. After the step 143, the program proceeds to a step 144.

In the step 144, the CPU 54 determines whether or not the elapsed time since the commencement of activation of the glow plug 29 exceeds a preset interval Tref3. This reference interval Tref3 is chosen so that the sustenance of activation of the glow plug 29 for this period enables the temperature around the glow plug 29 to assume a level high enough to ignite the air-fuel mixture. The preset interval Tref3 is preferably 50 seconds. If elapsed time after commencement of activation of glow plug 29 does not exceed the preset interval Tref3, the program returns to the initial step 101 (see FIG. 4). As a result, activation of the glow plug 29 is sustained for the preset interval provided that the engine keeps running. When this elapsed time exceeds the preset interval Tref3, the program proceeds to a step 145.

In the step 145, the CPU 54 determines whether or not the temperature value derived from the temperature signal VT at a moment immediately prior to ignition of the air-fuel mixture has already been stored in its internal RAM. If the temperature value has not yet been stored, the program advances to a step 152 in which the current value of temperature derived from the temperature signal VT is stored in the RAM of the CPU 54. In this flowchart, the variable VT0 represents this temperature value. As will be made clear, the moment of sampling of the temperature value VT0 immediately precedes a moment of ignition of the air-fuel mixture. After the step 152, the program advances to a step 146. If the temperature value has been stored, the program advances from the step 145 directly to the step 146.

In the step 146, the control unit 50 performs air supply and fuel supply to the burner 25. Specifically, the control signal S3 designed to close the switch 51c (see FIG. 1) is outputted to the control terminal of the switch 51c. As described previously, closing of the switch 51c results in air supply to the burner 25. The control signal S1 designed to close the switch 51a (see FIG. 1) is outputted to the control terminal of the switch 51a. As described previously, closing of the switch 51a results in activation of the fuel pump 33 (see FIG. 1). The control signal S2 designed to close the switch 51b (see FIG. 1) intermittently at a fixed frequency is outputted to the control terminal of the switch 51b. As described previously, this periodic closing of the switch 51b results in the corresponding periodic opening of the fuel valve 30 (see FIG. 1). Accordingly, fuel is supplied to the burner 25. The rate of fuel supply depends on the duty cycle of the control signal S2.

In more detail, in the fuel supply section of the step 146, the CPU 54 determines a desired basic value of pulse width of the driving pulse current to the fuel valve 30 on the basis of the engine speed value N given in the step 101 and the engine load value Q given in the step 103. Specifically, the ROM 55 holds a table in which a set of desired basic pulse-width values are plotted as a function of the engine speed value N and the engine load value Q. The determination of the basic pulse-width value is carried out by referring to this table. It should be noted that the pulse-widths of the current pulses driving the fuel valve 30 correspond to the interval of time for which the fuel valve 30 remains open. The current pulses driving the fuel valve 30 have a fixed frequency, preferably chosen to be 25 Hz. The desired basic pulse-width values are preferably in the range of 0 to 40 milliseconds. Then, the CPU 54 determines a desired final value of pulse-width of the current pulses driving the fuel valve 30 on the basis of the desired basic pulse-width value. Specifically, the desired final pulse-width value is equal to the desired basic pulse-width value multiplied by a factor of 2.0 so as to facilitate ignition. Finally, the control signal S2 in the form of a pulse train having a constant frequency equal to the fixed value and having a pulse-width equal to the desired final pulse-width value is outputted to the control terminal of the switch 51b so that the switch 51b is closed intermittently at the same fixed frequency and the duration of each closing of the switch 51b is maintained at a value equal to the desired final pulse-width value. This periodic closing of the switch 51b actuates a correspondingly periodic opening of the fuel valve 30. This opening of the fuel valve 30 allows fuel supply to the burner 25 at a rate determined by the desired final pulse-width value.

In a step 147 subsequent to the step 146, the current value of the temperature is derived from the temperature signal VT. In this flowchart, the variable VT1 represents this temperature value. The moment of sampling of the temperature value VT1 immediately follows the ignition of the air-fuel mixture. Then, the CPU 54 determines the difference between the temperature value VT1 and the temperature value VT0 given in the step 152. Specifically, "$\Delta VT = VT1 - VT0$" is executed, where $\Delta VT$ is a variable representing the temperature difference. Since the variables VT0 and VT1 represent the values of temperature at the moments immediately preceding and following ignition of the air-fuel mixture, the variable $\Delta VT$ represents the increase in the temperature caused by the ignition. Finally, the CPU 54 determines whether or not the temperature difference $\Delta VT$ exceeds a preset level Href1 preferably chosen to be 100° C. If the temperature difference $\Delta VT$ exceeds the preset level Href1, the program advances to a step 148. If the temperature difference $\Delta VT$ does not exceed the preset level Href1, the program advances to a step 153.

In the step 153, the CPU 54 determines whether or not the time elapsed since commencement of the air-fuel mixture supply exceeds a preset interval Tref4 equal to the longest value necessary for the temperature difference $\Delta VT$ to reach the preset level Href1. If this elapsed time does not exceed the preset interval Tref4, the program returns to the initial step 101 (see FIG. 4). If the elapsed time exceeds the preset interval Tref4, the program advances to the burner deactivation step 113 (see FIG. 4) and then returns to the initial step 101. The reference interval Tref4 is preferably 10 seconds.

In the step 148, the CPU 54 determines whether or not the temperature value VT1 exceeds a preset level Href2 at which self-sustaining combustion of the air-fuel mixture will occur. This preset level Href2 is preferably 500° C. If the temperature value VT1 exceeds the preset level Href2, the program advances to a step 149. If the temperature value VT1 does not exceed the preset level Href2, the program advances to a step 154.

In the step 154, the CPU 54 determines whether or not the time elapsed since ignition of the air-fuel mixture exceeds a preset interval Tref5 preferably chosen to be 40 seconds. If this elapsed time does not exceed the preset interval Tref5, the program returns to the initial step 101 (see FIG. 4). If the elapsed time exceeds the preset interval Tref5, the program advances to the burner deactivation step 113 (see FIG. 4) and then returns to the initial step 101. Accordingly, in the case where self-sustaining combustion is not attained within the fixed length of time defined by the preset interval Tref5, the burner 25 is deactivated.

In the step 149, the control unit 50 deactivates the glow plug 29. Specifically, the control signal S4 designed to open the switch 51d is outputted to the control terminal of the switch 51d. As described previously, opening of the switch 51d results in deactivation of the glow plug 29. Accordingly, in the case where self-sustaining combustion is attained, the glow plug 29 is deactivated. After the step 149, the program proceeds to the step 150.

In the step 150 following one of the steps 142 and 149, the control unit 50 performs temperature control designed to ensure adequate unclogging of the filter 23. As will be made clear, the program branches to either a step 151 or the burner deactivation step 113 (see FIG. 4). After the step 113, the program returns to the initial step 101 as illustrated in FIG. 4.

In the step 151, the CPU 54 determines whether or not the time elapsed since the commencement of unclogging of the filter 23 exceeds a preset interval Tref6 preferably chosen to be 3 minutes. If this elapsed time does not exceed a preset interval Tref6, the program returns to the initial step 101 (see FIG. 4). If the elapsed time exceeds the preset interval Tref6, the program advances to the burner deactivation step 113 (see FIG. 4) and then returns to the initial step 101.

Figure 8:
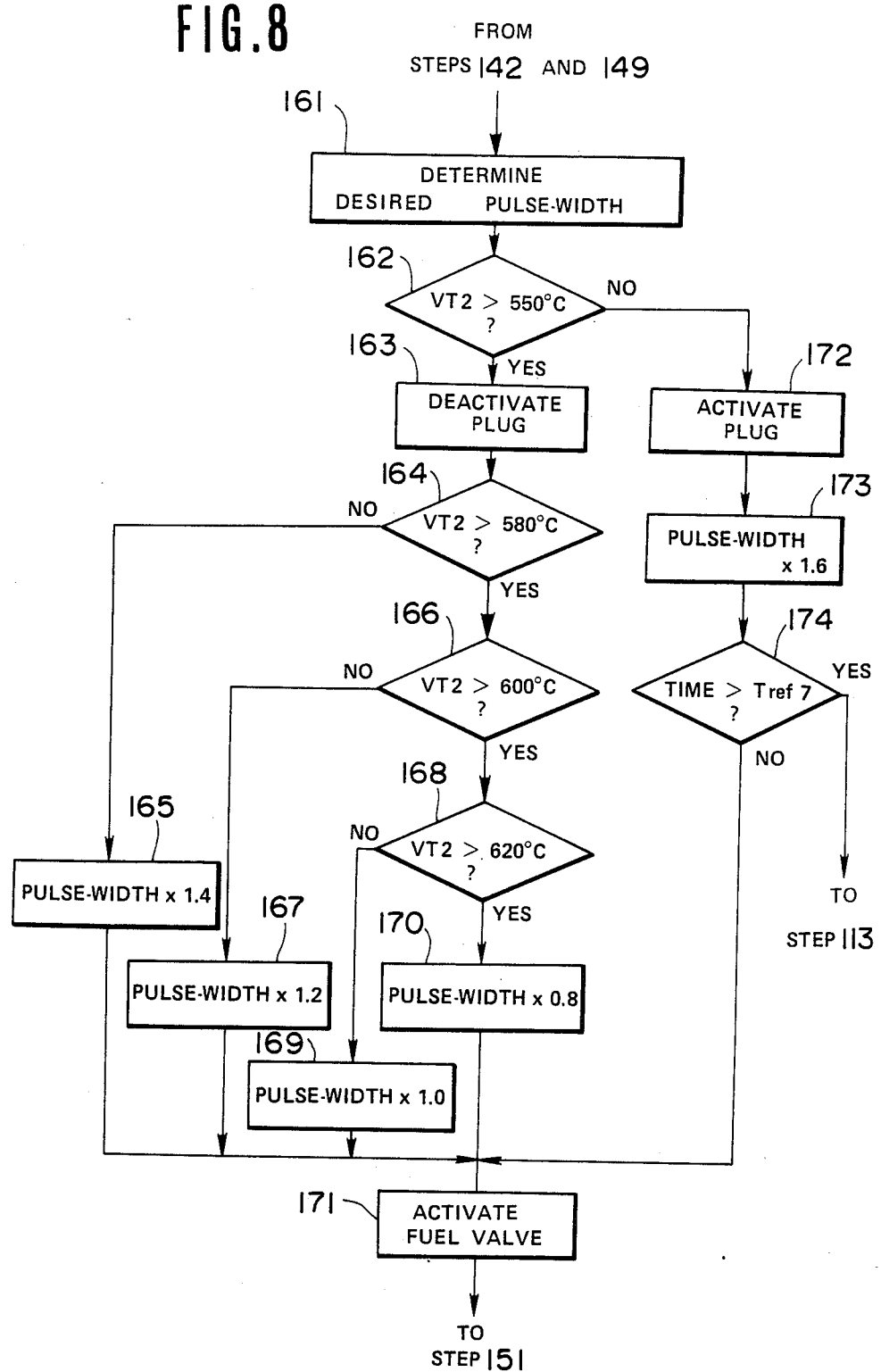
FIG. 8 is a detailed flowchart of the temperature control step of FIG. 7.

FIG. 8 is a detailed flowchart of the temperature control step 150. In a step 161 following one of the steps 142 and 149 (see FIG. 7), the CPU 54 determines a desired basic value of the pulse-width of the current pulses driving the fuel valve 30 on the basis of the engine speed value N and the engine load value Q in the same way as in the step 146 (see FIG. 7). After the step 161, the program proceeds to a step 162.

In the step 162, the current value of the temperature is derived from the temperature signal VT. In this flowchart, a variable VT2 represents this temperature value. Then, the CPU 54 determines whether or not the temperature value VT2 exceeds a preset level Href3 corresponding to a minimum temperature for reliable unclogging of the filter 23. This reference level Href3 is preferably 550° C. If the temperature value VT2 does not exceed the preset level Href3, the program proceeds to a step 172. If the temperature value VT2 exceeds the preset level Href3, the program proceeds to a step 163.

In the step 172, the control unit 50 activates the glow plug 29 as in the step 143 (see FIG. 7). This activation of the glow plug 29 is to facilitate combustion of the air-fuel mixture.

In the step 173 subsequent to the step 172, the CPU 54 determines a desired final value of the pulse-width of the current pulses driving the fuel valve 30 on the basis of the desired basic pulse-width value given in the step 161. Specifically, the desired final pulse-width value is equal to the corresponding basic value multiplied by a factor of 1.6. After the step 173, the program advances to a step 174.

In the step 174, the CPU 54 determines whether or not the time elapsed since the moment at which the temperature value VT2 first dropped below the reference level Href3 in the step 162 or since the moment at which the temperature value VT1 first rose above the reference level Href2 in the step 148 (see FIG. 7) exceeds a preset interval Tref7. This reference interval Tref7 is preferably 15 seconds. If this elapsed time exceeds the preset interval Tref7, the program advances to the burner deactivation step 113 (see FIG. 4) and then returns to the initial step 101 (see FIG. 4). If the elapsed time does not exceed the preset interval Tref7, the program advances to a step 171.

In the step 163, the control unit 50 deactivates the glow plug 29 as in the step 149 (see FIG. 7). After the step 163, the program advances to a step 164.

In the step 164, the CPU 54 determines whether or not the temperature value VT2 exceeds a preset level Href4 preferably chosen to be 580° C. If the temperature value VT2 does not exceed the preset level Href4, the program advances to a step 165. If the temperature value VT2 exceeds the preset level Href4, the program advances to a step 166.

In the step 165, the CPU 54 determines a desired final value of the pulse-width of the current pulses driving the fuel valve 30 on the basis of the desired basic pulse-width value given in the step 161. Specifically, the desired final pulse-width value is equal to the corresponding basic value multiplied by a factor of 1.4. After the step 165, the program proceeds to the step 171.

In the step 166, the CPU 54 determines whether or not the temperature value VT2 exceeds a preset level Href5 preferably chosen to be 600° C. If the temperature value VT2 does not exceed the preset level Href5, the program advances to a step 167. If the temperature value VT2 exceeds the preset level Href5, the program advances to a step 168.

In the step 167, the CPU 54 determines a desired final value of the pulse-width of the current pulses driving the fuel valve 30 on the basis of the desired basic pulse-width value given in the step 161. Specifically, the desired final pulse-width value is equal to the corresponding basic value multiplied by a factor of 1.2. After the step 167, the program proceeds to the step 171.

In the step 168, the CPU 54 determines whether or not the temperature value VT2 exceeds a preset level Href6 preferably chosen to be 620° C. If the temperature value VT2 does not exceed the preset level Href6, the program advances to a step 169. If the temperature value Href6 exceeds the preset level Href6, the program advances to a step 170.

In the step 169, the CPU 54 determines a desired final value of the pulse-width of the current pulses driving the fuel valve 30 on the basis of the desired basic pulse-width value given in the step 161. Specifically, the desired final pulse-width value is equal to the corresponding basic value multiplied by a factor of 1.0. After the step 169, the program advances to the step 171.

In the step 170, the CPU 54 determines a desired final value of the pulse-width of the current pulses driving the fuel valve 30 on the basis of the desired basic pulse-width value given in the step 161. Specifically, the desired final pulse-width value is equal to the corresponding basic value multiplied by a factor of 0.8. After the step 170, the program advances to the step 171.

In the step 171, the control unit 50 energizes the fuel valve 30 intermittently at the fixed frequency while maintaining the duration of each energization cycle of the fuel valve 30 at a value equal to the desired final pulse-width value determined in the steps 165, 167, 169, 170, or 173. Specifically, the control signal S2 in the form of a pulse train having a constant frequency equal to the fixed value and having a pulse-width equal to the desired final pulse-width value determined in the steps 165, 167, 169, 170, or 173 is outputted to the control terminal of the switch 51b so that the switch 51b is closed intermittently at the same frequency and the duration of each cycle of closure of the switch 51b matching the desired final pulse-width value. This periodic closing of the switch 51b actuates a correspondingly periodic opening of the fuel valve 30. The opening of the fuel valve 30 allows fuel supply to the burner 25. It should be noted that air supply to the burner 25 is allowed by the step 146 (see FIG. 7). After the step 171, the program advances to the step 151 (see FIG. 7).

The rate of fuel supply to the burner 25 determined by the desired final pulse-width value varies as a function of the engine speed and load. Furthermore, as a result of execution of the steps 164, 165, 166, 167, 168, 169, and 170, the rate of fuel supply to the burner 25 decreases with increases in the temperature value VT2. Accordingly, the temperature in the burner 25 is maintained within a range, preferably of 600°–620° C., which is suitable for reliable unclogging of the filter 23.

Figure 9:
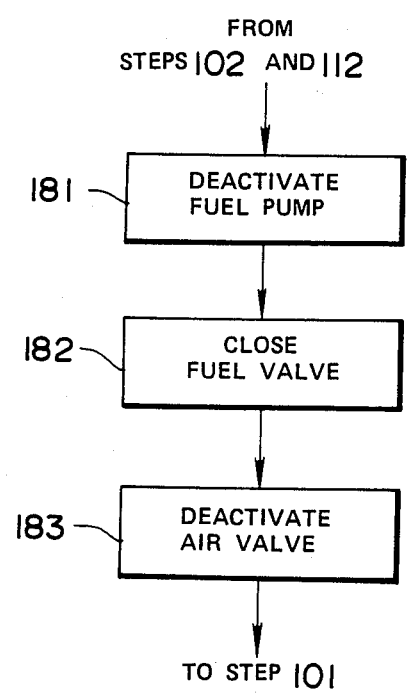
FIG. 9 is a detailed flowchart of the burner deactivation step of FIG. 4.

FIG. 9 is a detailed flowchart of the burner deactivation step 113 of FIG. 4. In a step 181 following one of the steps 102 and 112 (see FIG. 4), the control unit 50 de-energizes the fuel pump 33. Specifically, the control signal S1 designed to open the switch 51a is outputted to the control terminal of the switch 51a. Opening of the switch 51a results in de-energization of the fuel pump 33.

In a step 182 subsequent to the step 181, the control unit 50 continuously closes the fuel valve 30. Specifically, the control signal S2 designed to continuously open the switch 51b is outputted to the cnotrol terminal of the switch 51b. Opening of the switch 51b results in closing of the fuel valve 30. Accordingly, fuel supply to the burner 25 is interrupted.

In a step 183 subsequent to the step 182, the control unit 50 de-energizes the air valve 37 (see FIG. 1). Specifically, the control signal S3 designed to open the switch 51c is outputted to the control terminal of the switch 51c. Opening of the switch 51c results in de-energization of the air valve 37. This interrupts air supply to the burner 25. After the step 153, the program returns to the initial step 101 (see FIG. 4).

DESCRIPTION OF THE SECOND PREFERRED EMBODIMENT

Figure 10:
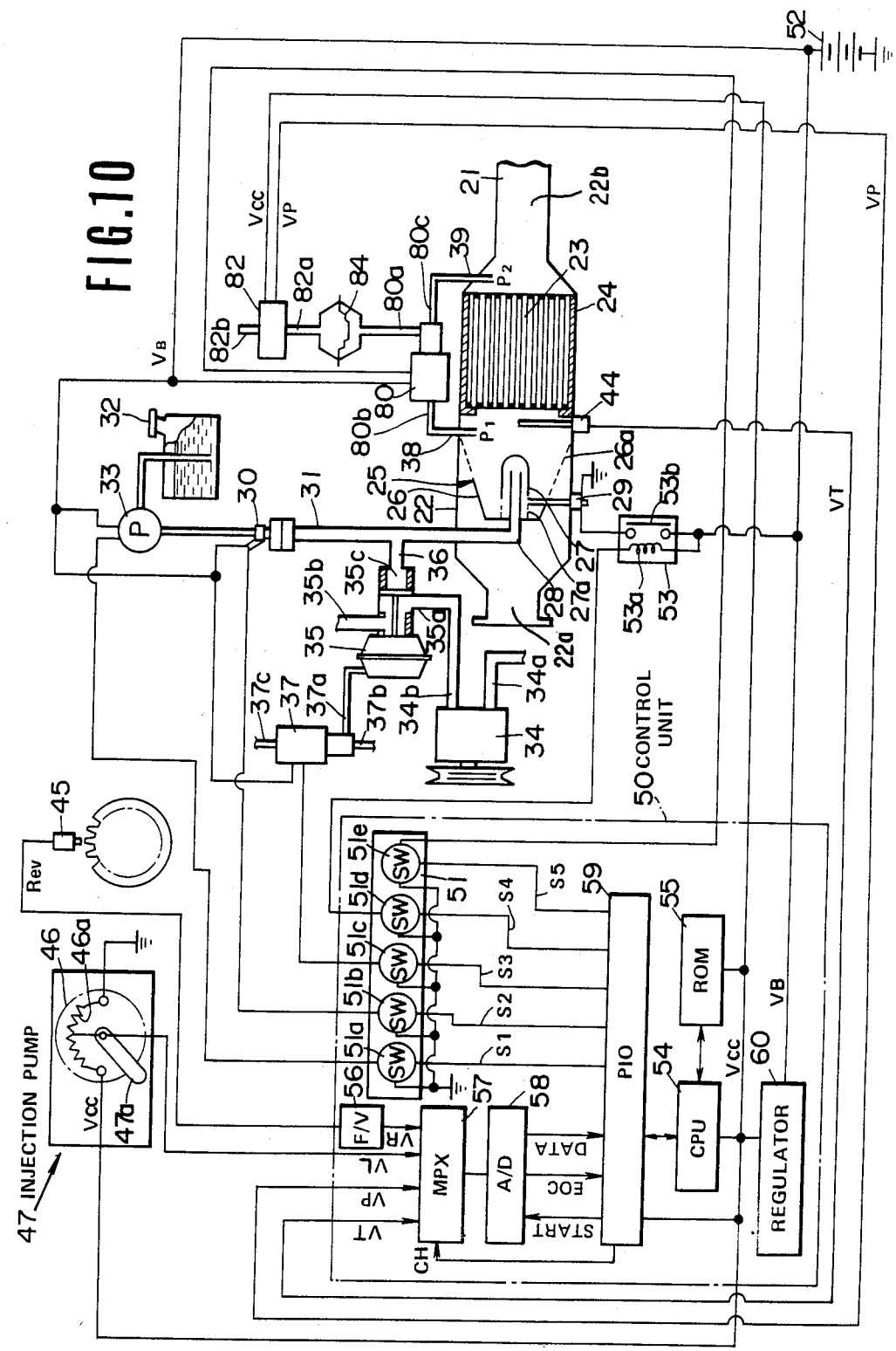
FIG. 10 is a diagram of an exhaust particle removing system according to a second embodiment of this invention.

FIG. 10 shows a second embodiment of this invention. This embodiment is designed in a manner similar to that of the embodiment of FIG. 1 except for the modifications described below. An electromagnetic three-way valve 80 has three ports 80a, 80b, and 80c. When this valve 80 is electrically de-energized, the first port 80a is connected to the second port 80b and is disconnected from the third port 80c. When the valve 80 is electrically energized, the first port 80a is connected to the third port 80c and is disconnected from the second port 80b.

A first pressure introduction passage 38 connects the interior of the casing 22 to the second port 80b of the three-way valve 80. The junction of this passage 38 and the interior of the casing 22 is located at a point immediately upstream of the filter 23 so that the second port 80b is supplied with the pressure in the casing 22 at this point. A second pressure introduction passage 39 connects the interior of the casing 22 to the third port 80c of the three-way valve 80. The junction of this passage 39 and the interior of the casing 22 is located at a point immediately downstream of the filter 23 so that the third port 80c is supplied with the pressure in the casing 22 at this point.

A pressure sensor 82 has a sensing port 82a and a reference port 82b. This pressure sensor 82 detects the pressure difference between its ports 82a and 82b. The sensing port 82a is connected to the first port 80a of the three-way valve 80. A diaphragm 84 is disposed in the connection between the sensing port 82a and the first valve port 80a to prevent the transmission of heat and moisture but allow the transmission of pressure between them. In this way, the sensing port 82a is supplied with the pressure developed in the first valve port 80a. The reference port 82b leads to the open air via the air cleaner to be subjected to atmospheric pressure. The pressure sensor 82 is supplied with the constant voltage Vcc from the voltage regulator 60. The pressure sensor 82 outputs a voltage signal VP which represents the pressure difference between its ports 82a and 82b. The multiplexer 57 in the control unit 50 is electrically connected to the pressure sensor 82 to receive the pressure signal VP. The pressure sensor 82 may be of the piezoelectric type as used in the embodiment of FIG. 1.

The three-way valve 80 is electrically connected across the battery 52 via the switch 51e in the control unit 50. Accordingly, when the switch 51e is closed and opened, the three-way valve 80 is electrically energized and de-energized respectively. The control signal S5 applied to the control terminal of the switch 51e controls the operating position of the switch 51e.

When the switch 51e is opened, the three-way valve 80 is de-energized so that the first valve port 80a is connected to the second valve port 80b and is disconnected from the third valve port 80c. As a result, the upstream pressure P1 is supplied to the sensor sensing port 82a so that the pressure sensor 82 measures this upstream pressure P1 with respect to atmospheric pressure. When the switch 51e is closed, the three-way valve 80 is energized so that the first valve port 80a is connected to the third valve port 80c and is disconnected from the second valve port 80b. As a result, the downstream pressure P2 is supplied to the sensor sensing port 82a so that the pressure sensor 82 measures this downstream pressure P2 with respect to atmospheric pressure.

A program for controlling the operation of the control unit 50 is similar to the program of FIGS. 4, 5, 7, 8, and 9 except for modifications in the pressure sampling step 105.

Figure 11:
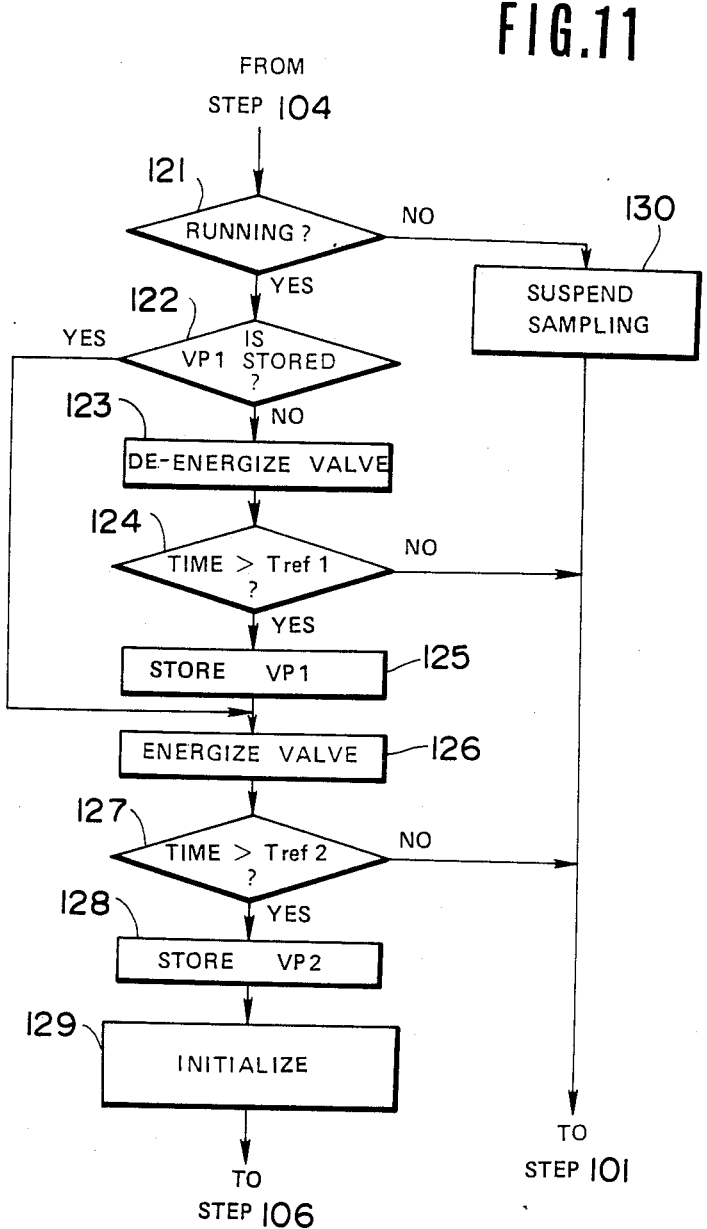
FIG. 11 is a detailed flowchart of the pressure sampling step in a program for controlling the operation of the control unit of FIG. 10.

FIG. 11 is a detailed flowchart of the modified pressure sampling step 105. This flowchart is similar to the flowchart of FIG. 5 except for the following design changes: In the step 123, the control unit 50 de-energizes the three-way valve 80. Specifically, the control signal S5 designed to open the switch 51e is outputted to the control terminal of the switch 51e. As described previously, opening the switch 51e causes de-energization of the three-way valve 80, thereby allowing the pressure sensor 82 to measure the upstream pressure P1.

In the step 124, the CPU 54 determines whether or not the time elapsed since the moment of de-energization of the three-way valve 80 exceeds the preset interval Tref1.

In the step 126, the control unit 50 energizes the three-way valve 80. Specifically, the control signal S5 designed to close the switch 51e is outputted to the control terminal of the switch 51e. As described previously, closing of the switch 51e results in energization of the three-way valve 80, and thereby allowing the pressure sensor 82 to measure the downstream pressure P2.

In the step 127, the CPU 54 determines whether or not the time elapsed since the moment of energization of the three-way valve 80 exceeds the preset interval Tref2.

In the step 128, the current downstream pressure valve VP2 derived from the pressure signal VP is stored in the RAM of the CPU 54.

The pressure values VP1 and VP2 given in the steps 125 and 128 are used in the solution of the equation "K0=VΔP/VP1", that is, "K0=(VP1−VP2)/VP1", executed in the later step 106 (see FIG. 4). It should be noted that (VP1−VP2)/VP1 equals 1−(VP2/VP1).

Figure 12:
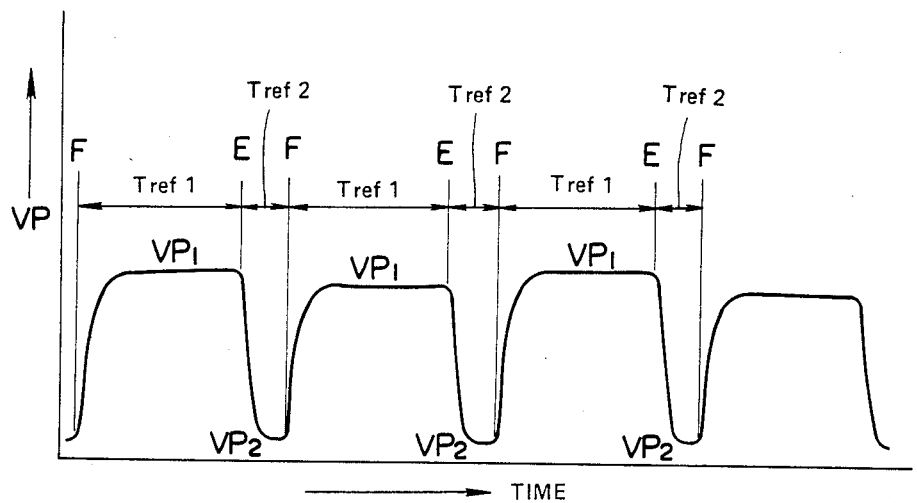
FIG. 12 is a diagram of the waveform of the pressure signal appearing in the system of FIG. 10.

FIG. 12 shows the waveform of the pressure signal VP. The three-way valve 80 is changed from the de-energized state to the energized state at moments denoted by the letter E. The three-way valve 80 is changed from the energized state to the de-energized state at moments denoted by the letter F. A certain time lag after changes of the state of the three-way valve 80, the pressure signal VP reflelctls the true pressure values. The three-way valve 80 remains de-energized during the time intervals Tref1 determined in the step 124 (see FIG. 11). The three-way valve 80 remains energized during the time intervals Tref2 determined in the step 127 (see FIG. 11). These intervals Tref1 and Tref2 are chosen to be longer than the time lag described previously. Furthermore, the time interval Tref1 is longer than the time interval Tref2, thus decreasing the frequency of changes of the states of the three-way valve 80 in order to increase the service life of the valve 80. The time interval Tref2 is preferably 0.2 seconds. The moments of sampling of the upstream pressure values VP1 immediately precede the moments E at which the three-way valve 80 is energized. The moments of sampling of the downstream pressure values VP2 immediately precede the moments F at which the three-way valve 80 is de-energized. The intervals between the sampling of the paired values VP1 and VP2 are essentially equal to the preset interval Tref2. Since this interval Tref2 is short, the paired values VP1 and VP2 can be considered to be measured at essentially the same moment. This setting ensures the accuracy of these values VP1 and VP2 even under rapidly changing operating conditions of the engine.

Figure 13:
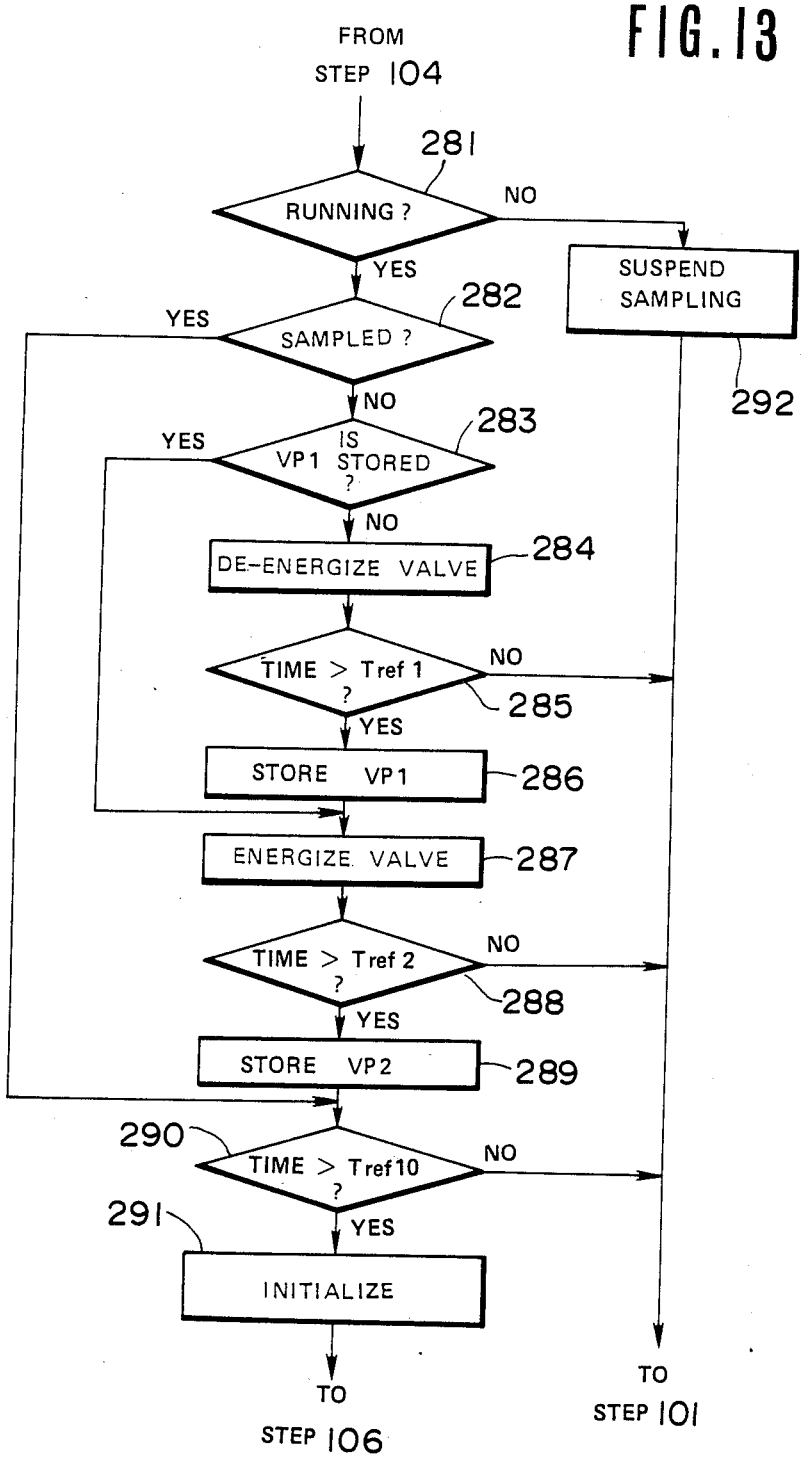
FIG. 13 is another example of the pressure sampling step used in the second embodiment.

FIG. 13 is another example of a detailed flowchart of the pressure sampling step 105. In a step 281 following the step 104 (see FIG. 4), the CPU 54 determines whether or not the engine is running normally. This step 281 is similar to the step 121 of FIG. 5. If the engine is not running normally, the program returns to the initial step 101 (see FIG. 4) by way of a step 292 in which the pressure sampling operation is suspended and initialized. The step 292 is similar to the step 130 of FIG. 5. If the engine is running normally, the program advances to a step 282.

In the step 282, the CPU 54 determines whether or not the pressure sampling operation has been already completed since the last execution of an initialization step 291 described hereafter, specifically whether or not both of the pressure values VP1 and VP2 have already been stored in the RAM of the CPU 54. If the pressure sampling operation has already been performed, the program advances to a step 290. If the pressure sampling operation has not yet been performed, the program advances to a step 283.

In the step 283, the CPU 54 determines whether or not the upstream pressure value VP1 derived from the pressure signal VP has already been stored in the RAM of the CPU 54 since the last execution of the initialization step 291. This step 283 is similar to the step 129 of FIG. 5. If the upstream pressure value VP1 has already been stored, the program advances to a step 287. If the upstream pressure value has not been yet stored, the program advances to a step 284.

In the step 284, the control unit 50 de-energizes the three-way valve 80. This step 284 is similar to the step 123 of FIG. 11. After the step 284, the program advances to a step 285.

In the step 285, the CPU 54 determines whether or not the time elapsed since the moment of de-energization of the three-way valve 80 exceeds the preset interval Tref1. This step 285 is similar to the step 124 of FIG. 11. If the elapsed time exceeds the preset interval Tref1, the program advances to a step 286. If the elapsed time does not exceed the preset interval Tref1, the program returns to the initial step 101 (see FIG. 4).

In the step 286, the current upstream pressure value VP1 derived from the pressure signal VP is stored in the RAM of the CPU 54. After the step 286, the program advances to a step 287.

In the step 287 following one of the steps 283 and 286, the control unit 50 energizes the three-way valve 80. This step 287 is similar to the step 126 of FIG. 11. After the step 287, the program advances to a step 288.

In the step 288, the CPU 54 determines whether or not the time elapsed since the moment of energization of the three-way valve 80 exceeds the preset interval Tref 2. This step 288 is similar to the step 127 of FIG. 11. If the elapsed time exceeds the preset interval Tref2, the program advances to a step 289. If the elapsed time does not exceed the preset interval Tref2, the program returns to the initial step 101 (see FIG. 4).

In the step 289, the current downstream pressure value VP2 derived from the pressure signal VP is stored in the RAM of the CPU 54. After the step 289, the program advances to a step 290.

In the step 290, the CPU 54 determines whether or not the elapsed time since the moment of energization of the three-way valve 80 exceeds a preset interval Tref10. If the elapsed time exceeds the preset interval Tref10, the program advances to the step 291. If the elapsed time does not exceed the preset interval Tref10, the program returns to the initial step 101 (see FIG. 4). The preset interval Tref10 is longer than the preset interval Tref2. During this interval Tref10, the three-way valve 80 remains energized.

In the step 291, the pressure sampling operation is initialized. This step 291 is similar to the step 129 of FIG. 5. After the step 291, the program advances to the step 106 (see FIG. 4).

Figure 14:
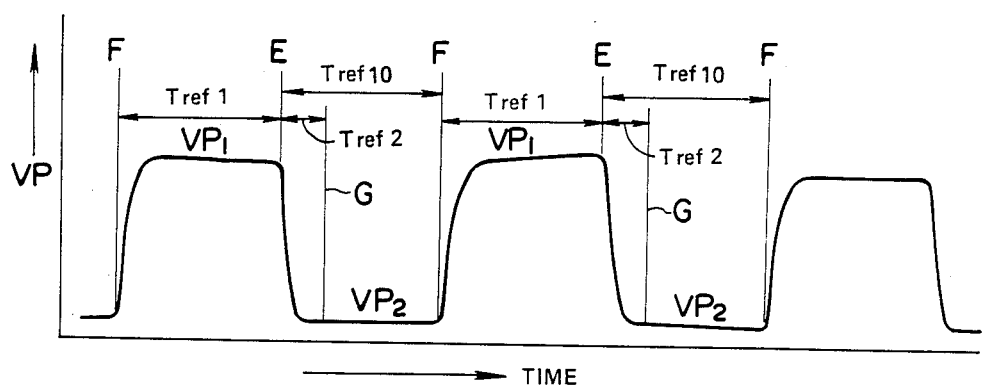
FIG. 14 is a diagram of the waveform of the pressure signal used in the program of FIG. 13.

FIG. 14 shows the waveform of the pressure signal VP in relation to the program of FIG. 13. The three-way valve 80 is changed from the de-energized state to the energized state at moments denoted by the letter E. The three-way valve 80 is changed from the energized state to the de-energized state at moments denoted by the letter F. During the time intervals Tref1 determined in the step 285 (see FIG. 13), the three-way valve 80 remains de-energized. During the time intervals Tref10 determined in the step 290 (see FIG. 13), the three-way valve 80 remains energized. The sampling of the downstream pressure value VP2 occurs substantially at moments denoted by the letter G which follow the moments E by the intervals Tref2 determined in the step 288 (see FIG. 13). Since the interval Tref10 is longer than the interval Tref2, the frequency of changes of the states of the three-way valve 80 is lower than that in the case of the program of FIG. 11. This results in a longer service life of the three-way valve 80.

It should be understood that further modifications and variations of this invention may be made without departing from the scope of this invention. For example, the ratio between the upstream pressure P1 and the downstream pressure P2 may be used as an indication of the degree of clogging of the filter 23 in place of the ratio between the pressure difference $\Delta P$ and the upstream pressure P1.

What is claimed is:

1. An exhaust particle removing system for an internal combustion engine, comprising:
    (a) a filter disposed in an engine exhaust passage for trapping particles suspended in exhaust gas;
    (b) a burner for burning off the particles deposited on the filter;
    (c) means for sensing selectively a pressure in the exhaust passage at a point upstream of the filter and a pressure difference in the exhaust passage across the filter;
    (d) means for determining a ratio between the upstream pressure and the pressure difference; and
    (e) means for operating the burner on the basis of said ratio.

2. The system of claim 1, wherein the sensing means comprises:
    (a) a pressure difference sensor including first and second sensing ports, the sensor measuring the difference between pressures at the first and second ports;
    (b) first means for connecting a point of the exhaust passage upstream of the filter to the first port of the sensor; and
    (c) second means for connecting the second port of the sensor selectively to one of a point of the exhaust passage downstream of the filter and atmosphere.

3. The system of claim 2, further comprising a diaphragm disposed in the connection between the exhaust passage and the first port of the sensor.

4. The system of claim 2, wherein the second connecting means comprises:
    (a) a three-way valve including first, second, and third ports, the first port of the valve being selectively connectable to one of the second port of the valve and the third port of the valve;
    (b) means for connecting the first port of the valve to the second port of the sensor;
    (c) means for connecting the second port of the valve to a point of the exhaust passage downstream of the filter; and
    (d) means for connecting the third port of the valve to atmosphere.

5. The system of claim 4, further comprising a diaphragm disposed in the connection between the first port of the valve and the second port of the sensor.

6. An exhaust particle removing system for an internal combustion engine, comprising:
    (a) a filter disposed in an engine exhaust passage for trapping particles suspended in exhaust gas;
    (b) a burner for burning off the particles deposited on the filter;
    (c) means for sensing selectively a pressure in the exhaust passage at a point upstream of the filter and a pressure in the exhaust passage at a point downstream of the filter;
    (d) means for determining a ratio between the upstream pressure and the downstream pressure; and
    (e) means for operating the burner on the basis of said ratio.

7. The system of claim 6, wherein the burner is activated on the basis of a value K0, where $K0 = 1 - (VP2/VP1)$, VP1 is the upstream pressure and VP2 is the downstream pressure.

8. The system of claim 6, wherein the sensing means comprises:
    (a) a pressure sensor including a sensing port, the sensor measuring the pressure in the sensing port; and
    (b) means for connecting the sensing port of the sensor selectively to one of a point of the exhaust passage upstream of the filter and a point of the exhaust passage downstream of the filter.

9. The system of claim 7, wherein the connecting means comprises:
    (a) a three-way valve including first, second, and third ports, the first port being selectively connectable to one of the second port and the third port;
    (b) a means for connecting the first port to the sensing port of the sensor;
    (c) means for connecting the second port to a point of the exhaust passage upstream of the filter; and
    (d) means for connecting the third port to a point of the exhaust passage downstream of the filter.

10. The system of claim 9, further comprising a diaphragm disposed in the connection between the sensing port of the sensor and the first port.

11. An exhaust particle removing system for an internal combustion engine, comprising:
    (a) a filter disposed in an engine exhaust passage for trapping particles suspended in exhaust gas;
    (b) a burner for burning off the particles deposited on the filter;
    (c) a single pressure sensor;
    (d) means for selectively applying to the pressure sensor either of a pressure in the exhaust passage at a point upstream of the filter and a pressure difference in the exhaust passage across the filter, thereby allowing the pressure sensor to selectively sense either of the upstream pressure and the pressure difference;
    (e) means for determining the ratio between the upstream pressure and the pressure difference; and
    (f) means for operating the burner on the basis of said ratio.

12. An exhaust particle removing system for an internal combustion engine, comprising:
    (a) a filter disposed in an engine exhaust passage for trapping particles suspended in exhaust gas;
    (b) a burner for burning off the particles deposited on the filter;

(c) a single pressure sensor;
(d) means for selectively applying to the pressure sensor either of a pressure in the exhaust passage at a point upstream of the filter and a pressure in the exhaust passage at a point downstream of the filter, thereby allowing the pressure sensor to selectively sense either of the upstream pressure and the downstream pressure;
(e) means for determining the ratio between the upstream pressure and the downstream pressure; and
(f) means for operating the burner on the basis of said ratio.

* * * * *